United States Patent
Gong et al.

(10) Patent No.: US 7,091,967 B2
(45) Date of Patent: Aug. 15, 2006

(54) APPARATUS AND METHOD FOR IMAGE FRAME SYNCHRONIZATION

(75) Inventors: Jin-Sheng Gong, Tao-Yuan Hsien (TW); Issac Chen, Kao-Hsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 408 days.

(21) Appl. No.: 10/605,016

(22) Filed: Sep. 1, 2003

(65) Prior Publication Data

US 2005/0057551 A1    Mar. 17, 2005

(51) Int. Cl.
*G09G 5/00*    (2006.01)

(52) U.S. Cl. .................. 345/213; 345/3.2; 345/3.3; 345/3.4; 345/660

(58) Field of Classification Search ............... 345/213, 345/3.2–3.4, 660
See application file for complete search history.

(56) References Cited

U.S. PATENT DOCUMENTS

| | | |
|---|---|---|
| 5,739,867 A | 4/1998 | Eglit |
| 6,002,446 A | 12/1999 | Eglit |
| 6,285,402 B1 * | 9/2001 | Miyazaki et al. ........... 348/445 |
| 6,313,822 B1 * | 11/2001 | McKay et al. .............. 345/698 |
| 6,545,688 B1 * | 4/2003 | Loveridge et al. .......... 345/660 |

FOREIGN PATENT DOCUMENTS

WO    WO 03/071513 A2    8/2003

* cited by examiner

*Primary Examiner*—Richard Hjerpe
*Assistant Examiner*—Leonid Shapiro
(74) *Attorney, Agent, or Firm*—Winston Hsu

(57) ABSTRACT

A source frame signal received at a first frame rate is converted to a destination frame signal output at a second frame rate. By adjusting the clock frequency of the clock signal in the destination frame signal, the second frame rate is made to be the same as the first frame rate. Adjusting the destination clock frequency prevents overflow and underflow conditions. The destination clock frequency is decreased to prevent underflow or increased to prevent overflow. The destination clock frequency during the last horizontal line is adjusted to comply with some display devices having a maximum time constraint from a last horizontal sync signal to a vertical sync signal in the destination frame signal.

14 Claims, 5 Drawing Sheets

APPARATUS AND METHOD FOR IMAGE FRAME SYNCHRONIZATION

BACKGROUND OF INVENTION

1. Field of the Invention

The invention relates to video display devices, and more particularly, to converting from a first display resolution to a second display resolution using image frame synchronization.

2. Description of the Prior Art

Graphics systems display images on display screens. For example, a computer system may display an image on a flat-panel monitor. Television systems and cameras are additional examples of such graphics systems. To achieve the display of an image, the image is generally represented by image data (e.g., RGB data), and display signals are generated from the image data. The standard VGA format is 640 pixels wide by 480 pixels high.

FIG. 1 shows a timing diagram 10 of the typical display signals for a VGA system. The display signals including a vertical sync signal VS indicating the beginning of each screen, also called a frame; a horizontal sync signal HS indicating the beginning of each row, also called a horizontal line; a data enable line indicating the pixel data in each scan line, and a clock signal. As shown in FIG. 1, a first frame starts at the first leading edge E1 of the vertical sync signal and a second frame starts at the second leading edge E2.

As graphics systems continue to have higher and higher display resolutions, a need emerges to convert image data from a first resolution to a second resolution. Graphics systems typically use special circuitry to convert image resolution. Examples of such circuitry include the well-known graphics controller chips typically housed on a motherboard of a computer system and LCD control chip sets provided with LCD panels and video cameras.

For most new displays, it is sufficient to use the same frame rate for the source display signals and the destination display signals, simplifying the design and reducing the required memory. This technique is called frame synchronization and involves generating a destination frame for each source frame received and outputting the destination frames at the same rate as the source frames are received.

A significant timing problem is inherent in frame synchronization. The source signals contain both visible horizontal lines and non-visible horizontal lines. Resolution is normally specified in terms of visible pixels only but, in actuality, there are the additional non-visible horizontal lines and non-visible pixels at the ends of the visible horizontal lines. If a resolution is converted from x to y then the ratio of x:y must also hold for the non visible horizontal lines. An example of where difficulties are encountered is when converting frame signals for a typical VGA system. As previously mentioned, the typical VGA system is 640×480, or 480 horizontal lines; however, in actuality there are approximately 504 horizontal sync signals sent for each vertical sync signal. The extra horizontal lines are not visible but are present to allow the display device time to return to the upper left corner before beginning the next refresh cycle. The ratio of visible source horizontal lines to visible destination horizontal lines must be equal to the ratio of total source horizontal lines to total destination horizontal lines. If a destination display device having a resolution of 1280×1024 is to be used, this equates to 1024/480*504 or a total of 1075.2 destination horizontal lines. The value of the destination horizontal lines must be an integer but if this value is rounded up, overflow occurs because the source frame rate will be higher than the destination frame rate. Conversely, if this value is rounded down, underflow occurs because the source frame rate will be lower than the destination frame rate.

SUMMARY OF INVENTION

It is therefore a primary objective of the claimed invention to provide an apparatus and method for image frame synchronization, to solve the above-mentioned timing problem and prevent overflow and underflow.

According to the claimed invention, an apparatus for converting a source frame signal to a destination frame signal is disclosed. The source frame signal is received at a first frame rate, and the destination frame signal is output at a second frame rate. The apparatus comprises a converter for converting the source frame signal to the destination frame signal having a destination clock signal at a destination clock frequency; and a frequency synthesizer for generating the destination clock signal and adjusting the destination clock frequency such that the first frame rate and the second frame rate are substantially the same.

According to the claimed invention, a method of frame synchronization for converting a source frame signal to a destination frame signal is disclosed. The source frame signal is received at a first frame rate, and the destination frame signal is output at a second frame rate. The method comprises the following steps: generating the destination frame signal according to the source frame signal, wherein the destination frame signal includes a destination clock signal at a destination clock frequency; and adjusting the destination clock frequency such that the first frame rate and the second frame rate are substantially the same.

It is an advantage of the claimed invention that by adjusting the destination clock frequency and fine-tuning the vertical sync signal, the leading edge of the vertical sync signal is synchronized with the horizontal sync signal when the frame synchronization apparatus receives the input vertical sync signal and that the first frame rate and the second frame rate are substantially the same.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
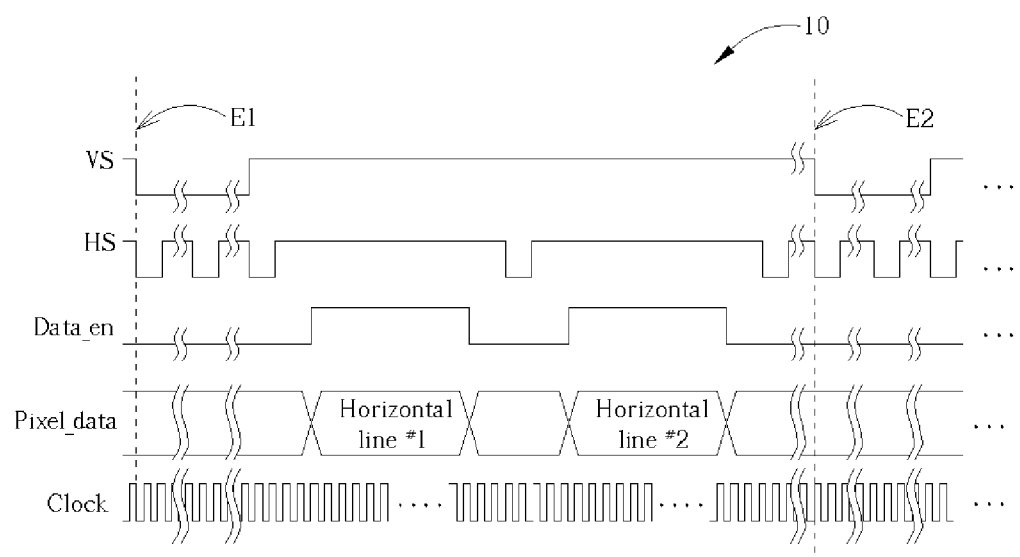
FIG. 1 is a timing diagram of typical video signals according to the prior art.
Figure 2:
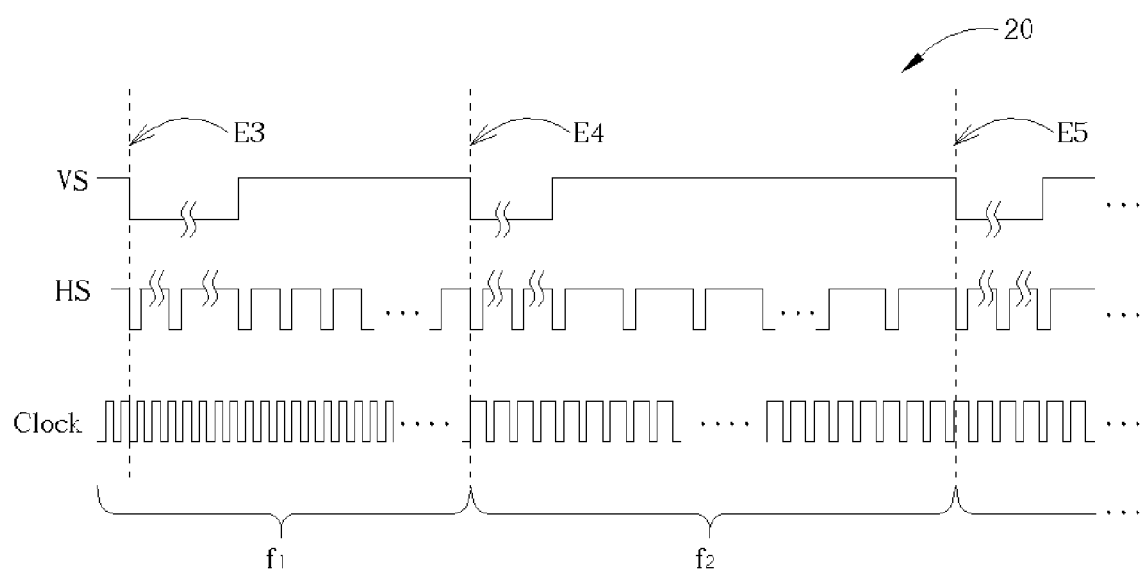
FIG. 2 is a timing diagram of video signals according to the present invention.

FIG. 2 shows a timing diagram of destination video signals according to the present invention. FIG. 2 includes the vertical sync signal VS, the horizontal sync signal HS, and the clock signal. A first frame starts with the edge E3 and contains horizontal rows indicated by the HS signal. A second frame starts with the edge E4 and also contains horizontal rows indicated by the HS signal. For simplicity of the diagram, the data enable signal and the pixel data signals are not shown in FIG. 2; however, as in FIG. 1, each horizontal row also contains a data enable signal (Data_en) indicating the pixel data (Pixel_data). Because the video signals (VS, HS, Data_en, Pixel_data) are synchronous with the clock signal, decreasing or increasing the frequency of the clock signal expands or compresses the frame respectively. As shown in FIG. 2, at the edge E4, the clock frequency is lowered from a first frequency $f_1$ to a second frequency $f_2$. The distance between the start of the first frame (the first frame starts at the edge E3) and the start of the second frame (edge E4) is less than the distance between the start of the second frame (edge E4) and the start of a third frame (edge E5). In other words the frame rate before edge E4 is higher than the frame rate after edge E4.

By adjusting the destination frame rate, the underflow and overflow problems of the prior art are solved. When an underflow condition occurs, the source frame rate is slightly lower than the destination frame rate. In this situation, the destination clock frequency is lowered such that the destination frame rate is equal to the source frame rate. When an overflow condition occurs, the source frame rate is slightly higher than the destination frame rate. In this situation, the destination clock frequency is raised such that the destination frame rate is equal to the source frame rate. Furthermore, the range of acceptable clock frequencies for most digital display devices is quite wide and adjusting the frequency in this way does not disrupt-normal operations.

Figure 3:
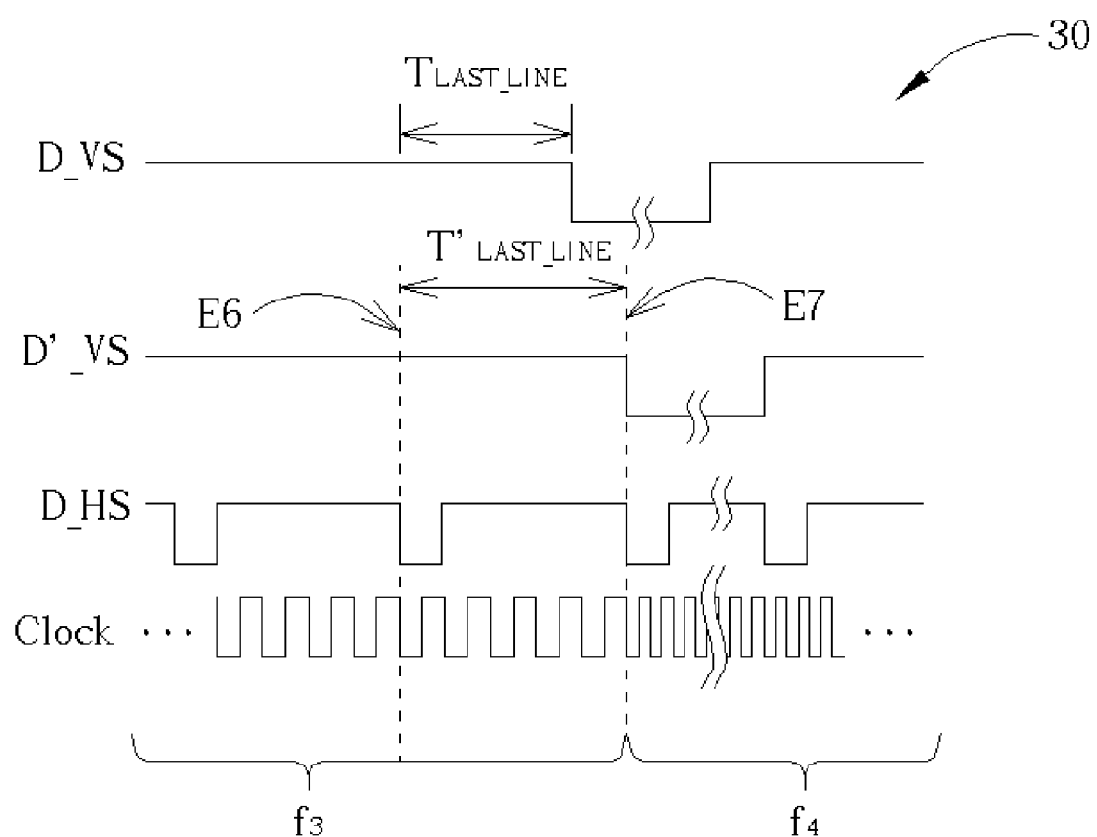
FIG. 3 is a timing diagram of the last horizontal sync signal and the vertical sync signal of FIG. 2.

FIG. 3 shows a timing diagram 30 of the relationship between the vertical sync signal D_VS and the horizontal sync signal D_HS. For some destination display devices, particularly some LCD panels, there is a hardware restriction limiting the time $T_{LIMIT}$ between the last horizontal sync signal D_HS and the vertical sync signal D_VS. In the conventional frame-synchronization apparatus, the vertical sync signal D_VS is locked (synchronized) with the input vertical sync signal I_VS. Thus, the time $T_{LAST\_LINE}$ is smaller than $T_{LIMIT}$ and cannot satisfy this timing requirement. For some display devices, the video signals need to comply with this restriction (the timing range $T_{LIMIT}$) or the display device will not function properly.

To satisfy this timing requirement, the frame synchronization apparatus can fine-tune the vertical sync signal D_VS such that the leading edge E7 of the vertical sync signal D_VS is synchronized with the horizontal sync signal D_HS when the frame synchronization apparatus receives the input vertical sync signal I_VS. Thus, the time $T_{LAST\_LINE}$ can satisfy the timing range $T_{LIMIT}$ of the display device. By adjusting the destination clock frequency, the frame synchronization apparatus can fine-tune the vertical sync signal D_VS and adjust the destination clock frequency to maintain the destination frame rate and satisfy the timing requirement.

Figure 4:
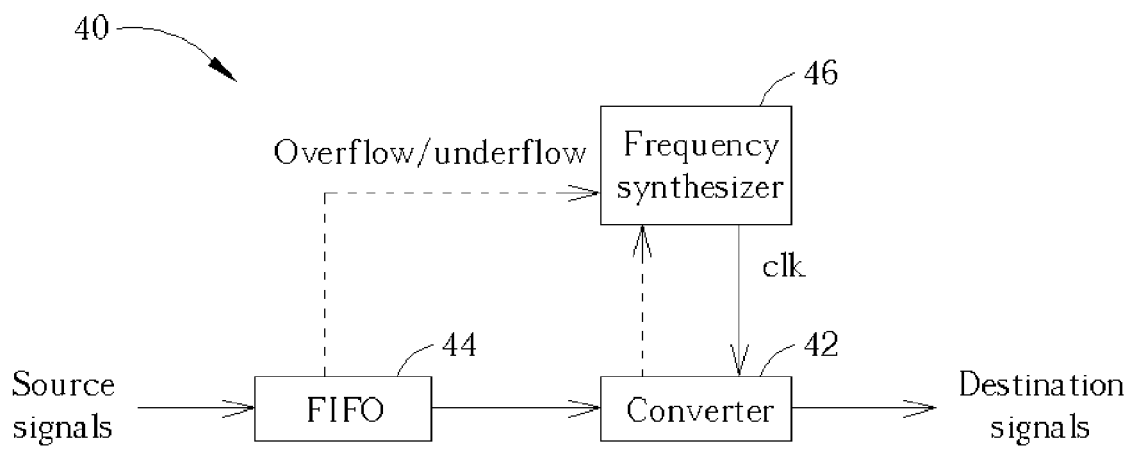
FIG. 4 is a frame synchronization apparatus according to the present invention.

FIG. 4 shows a frame synchronization apparatus according to the present invention. The frame synchronization apparatus 40 includes a converter 42, a First-In-First-Out (FIFO) buffer 44, and a frequency synthesizer 46. Source video signals at a first display resolution are received at a first frame rate and stored in the FIFO 44. The FIFO 44 stores incoming pixel data until read out of the FIFO 44 by the converter 42 to convert from the first resolution to the second resolution. For each image frame in the source video signals, the converter 42 generates a destination frame in the destination video signals at a second frame rate. The converter 42 uses the clock signal generated by the frequency synthesizer 46 as the destination clock signal and all signals in the destination video signals are synchronous with the destination clock signal. Besides using the clock signal provided by the frequency synthesizer, the structure and the operation of the converter 42 are well known by people skilled in the art and further description of the detailed operation of the converter 42 is hereby omitted. It should also be noted that although a FIFO 44 is used as the buffer, this is for example only and any buffer implementation can be used.

If the first frame rate is higher than the second frame rate, pixel data will overflow the FIFO 44 and an overflow signal is sent to the frequency synthesizer 46. To increase the second frame rate, the frequency synthesizer 46 increases the destination clock frequency such that the FIFO 44 is no longer in the overflow condition. When the destination clock frequency is increased, the destination frame takes less time to transmit and the second frame rate is increased. Conversely, if the first frame rate is lower than the second frame rate, pixel data will be read out of the FIFO 44 too quickly and the FIFO 44 will underflow. In this situation, an underflow signal is sent from the FIFO 44 to the frequency synthesizer 46. To decrease the second frame rate, the frequency synthesizer 46 decreases the destination clock frequency such that the FIFO 44 is no longer in the underflow condition. The frequency synthesizer 46 adjusts the destination clock frequency such that the pixel data in the FIFO 44 remains above a minimum level and below a maximum level. In this stable condition, the first frame rate and the second frame rate are substantially the same.

In the preferred embodiment of the present invention, the destination clock frequency is only adjusted once at initial startup. Once the second frame rate is adjusted to substantially the same rate as the first frame rate, no further adjustments of the clock frequency are necessary.

It should be noted that the frequency synthesizer 46 needs to adjust the destination clock frequency with an adjustment resolution sufficient to prevent overflow and underflow. As an example of how insufficient frequency synthesizer 46 resolution affects the frame synchronization apparatus 40, consider the case of overflow. If the FIFO 44 is in an overflow condition, the frequency synthesizer 46 must increase the frequency of the destination clock signal in order to increase the destination frame rate. However, if the resolution of the adjustment is insufficient, when the frequency is increased by a single unit of adjustment, the FIFO 44 will immediately enter the underflow condition because the destination frame rate becomes too fast. Likewise, in the underflow condition, when the frequency is decreased by a single unit of adjustment, the FIFO 44 will immediately enter the overflow condition because the destination frame rate becomes too slow. This unit of adjustment is referred to as the adjustment resolution and must be small enough to allow the second frame rate to be substantially the same as the first frame rate, eliminating both the overflow and underflow conditions of the FIFO 44.

The following formula can be used to calculate a sufficient adjustment resolution for the frequency synthesizer 46:

$$\text{Adjustment Resolution} < \frac{1}{2} \frac{(HorizontalVisible)}{HorizontalTotal \cdot VerticalTotal}$$

In the above formula, the HorizontalVisible parameter refers to the number of visible pixels in each horizontal line. For example in a typical SXGA system, the number of visible pixels in each horizontal line is 1280. The HorizontalTotal parameter refers to the total number of pixel data for each horizontal line. As can be seen from FIG. 1, only the pixels indicated by the data enable signal (Data_en) are visible on the screen. There are normally additional non-visible pixels, also referred to as porch signals, included in each horizontal line. For a typical SXGA system, the total number of pixel data for each horizontal line is 1344. Similarly the VerticalTotal parameter refers to the total number of horizontal lines in each frame. This number is normally greater than the visible lines on the display device, and for a typical SXGA system, VerticalTotal is also equal to 1066. Using the above formula for the SXGA example, the adjustment resolution equates to a value of less than $4.47 \times 10^4$ (or less than $2^{-11}$), meaning the destination clock frequency should be adjustable in increments of less than $2^{-11}$ of the original clock frequency.

Figure 5:
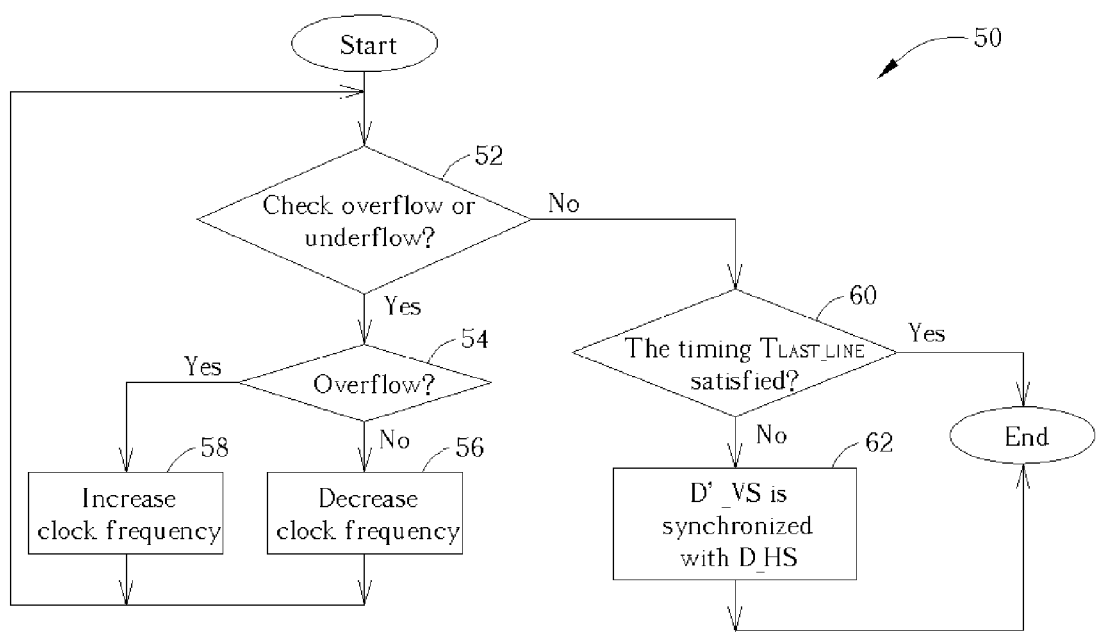
FIG. 5 is a flowchart showing the method of image frame synchronization according to the present invention.

FIG. 5 shows a flowchart 50 illustrating the method of frame synchronization according to the present invention. The flowchart 50 comprises the following steps:

Step 52: Check whether incoming pixel data in a buffer or memory remains above a minimum level and below a maximum level. In this stable condition, the first frame rate and the second frame rate are substantially the same so proceed to step 60, otherwise proceed to step 54.

Step 54: Check for an overflow condition. If an overflow condition exists then proceed to step 58, if not (underflow) then proceed to step 56.

Step 56: Decrease the destination clock frequency to lower the second frame rate. Proceed to step 52.

Step 58: Increase the destination clock frequency to increase the second frame rate. Proceed to step 52.

Step 60: Determine if the timing requirements for the last horizontal sync signal and the vertical sync signal of the destination display are satisfied. If satisfied then end, if timing adjustment is needed then proceed to step 62.

Step 62: Fine-tuning the vertical sync signal D_VS. The leading edge E7 of the vertical sync signal D_VS is synchronized with the horizontal sync signal D_HS when the frame synchronization apparatus receives the input vertical sync signal I_VS. Because the second frame rate must remain constant, the destination clock frequency during the next of the frame must be adjusted to ensure the second frame rate stays substantially the same as the first frame rate.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for converting a source frame signal to a destination frame signal, wherein the source frame signal is received at a first frame rate and the destination frame signal is output at a second frame rate, comprising:
    a converter for converting the source frame signal to the destination frame signal having a destination clock signal at a destination clock frequency; and
    a frequency synthesizer for generating the destination clock signal and dynamically adjusting the destination clock frequency such that the first frame rate and the second frame rate are substantially the same;
    wherein the destination display signal includes a last horizontal line defined by a last horizontal sync signal and a vertical sync signal wherein the last horizontal sync signal is the last of a plurality of horizontal sync signal, and the frequency synthesizer synchronously generates the outnut vertical sync signal with the horizontal sync signal during the last horizontal line.

2. The apparatus of claim 1 wherein the source frame signal is at a first resolution and the destination frame signal is at a second resolution.

3. The apparatus of claim 1 further comprising:
    a buffer for storing at least a part of the source frame signal;
    wherein the frequency synthesizer adjusts the destination clock frequency by decreasing the destination clock frequency to prevent underflow in the buffer or by increasing the destination clock frequency to prevent overflow in the buffer.

4. The apparatus of claim 1 wherein the frequency synthesizer adjusts the destination clock frequency by decreasing the destination clock frequency when the second frame rate is faster than the first frame rate or by increasing the destination clock frequency when the second frame rate is slower than the first frame rate.

5. The apparatus of claim 1 wherein the converter receives the source frame signal at a source clock signal, and the destination clock signal is independent on the source clock signal.

6. The apparatus of claim 1 wherein the frequency synthesizer is a phase-locked loop (PLL).

7. The apparatus of claim 1 wherein the converter is a scaler.

8. A method of frame synchronization for converting a source frame signal to a destination frame signal, wherein the source frame signal is received at a first frame rate, the destination frame signal is output at a second frame rate, comprising:
    generating the destination frame signal according to the source frame signal, wherein the destination frame signal includes a destination clock signal at a destination clock frequency; and
    dynamically adjusting the destination clock frequency such that the first frame rate and the second frame rate are substantially the same;
    wherein the destination frame includes a last horizontal line defined by a last horizontal sync signal and a vertical sync signal, wherein the last horizontal sync signal is the last of a plurality of horizontal sync sianals, the method further comprising the step of synchronously generating the output vertical sync signal with the horizontal sync signal during the last horizontal line.

9. The method of claim 8 wherein the source frame signal is at a first resolution and the destination frame signal is at a second resolution.

10. The method of claim 8 wherein the step of adjusting the destination clock frequency is executed by decreasing the destination clock frequency to prevent underflow or by increasing the destination clock frequency to prevent overflow.

11. The method of claim 8 wherein the step of adjusting the destination clock frequency is executed by decreasing the destination clock frequency when the second frame rate is faster than the first frame rate or by increasing the destination clock frequency when the second frame rate is slower than the first frame rate.

12. The method of claim 8 wherein the destination clock frequency has a first resolution such that the first frame rate and the second frame rate are substantially the same.

13. The method of claim 12 wherein the destination clock frequency is adjusted utilizing an adjustment resolution being approximately satisfied by $$A \text{ first resolution} < \frac{1}{2} \frac{(HorizontalVisible)}{HorizontalTotal \cdot VerticalTotal},$$

wherein the HorizontalVisible parameter refers to the number of visible pixels in each horizontal line, the HorizontalTotal parameter refers to the total number of pixel data for each horizontal line, the VerticalTotal parameter refers to the total number of horizontal lines in each frame.

14. A method of frame synchronization for converting a source frame signal to a destination frame signal, wherein the source frame signal is received at a first frame rate, the destination frame signal is output at a second frame rate, comprising:

generating the destination frame signal according to the source frame signal, wherein the destination frame signal includes a destination clock signal at a destination clock frequency; and dynamically adjusting a period of the destination frame signal such that the first frame rate and the second frame rate are substantially the same;

wherein the destination frame includes a last horizontal line defined by a last horizontal sync signal and a vertical sync sianals, the last horizontal sync signal is the last of a plurality of horizontal sync signals, the method further comprising the step of synchronously generating the vertical sync signal according to the horizontal sync signal during the last horizontal line.

* * * * *